United States Patent [19]

Iwata

[11] Patent Number: 4,903,072

[45] Date of Patent: Feb. 20, 1990

[54] IMAGE FORMING APPARATUS HAVING COOLING EFFICIENCY SWITCHING CONTROL FUNCTION

[75] Inventor: Yasuhiro Iwata, Yokohama, Japan

[73] Assignee: Kabushiki Kaisha Toshiba, Kawasaki, Japan

[21] Appl. No.: 197,822

[22] Filed: May 23, 1988

[30] Foreign Application Priority Data

May 30, 1987 [JP] Japan ............................... 62-136290

[51] Int. Cl.⁴ ............................................ G03B 27/52

[52] U.S. Cl. ...................................................... 355/30

[58] Field of Search ................................ 355/30, 14 R

[56] References Cited

U.S. PATENT DOCUMENTS 4,303,334 12/1981 Haupt et al. .......................... 355/30

FOREIGN PATENT DOCUMENTS 2642610 3/1977 Fed. Rep. of Germany ........ 355/30

52-68410 6/1977 Japan ..................................... 355/30

58-14847 1/1983 Japan .

58-16254 1/1983 Japan .

59-100463 6/1984 Japan .

61-73968 4/1986 Japan .

61-219966 9/1986 Japan .

*Primary Examiner*—L. T. Hix

*Assistant Examiner*—D. Rutledge

*Attorney, Agent, or Firm*—Foley & Lardner, Schwartz, Jeffery, Schwaab, Mack, Blumenthal & Evans

[57] ABSTRACT

An image forming apparatus of the invention has a cooling fan which is used for forcibly decreasing a temperature raised by heat generated as a result a copying operation being performed, and which can be switched between high-speed/low-speed rotation modes. The image data on a document supported on an original table is exposed by an exposure lamp, regulated by a lamp regulator under the control of a main controller, and is optically scanned. The main controller forms an optical image corresponding to the image data on a photoconductive drum, develops it by means of a developing unit having a solenoid, and forms the developed image on a sheet. The image formed on the sheet is fixed by a fixing unit having a heater lamp under the control of a fixing unit controller. A cooling fan controller drives the cooling fan in a high-speed mode during the above copying operation and for a predetermined period of time after completion of the copying operation, thereby cooling the interior of the apparatus.

19 Claims, 10 Drawing Sheets

IMAGE FORMING APPARATUS HAVING COOLING EFFICIENCY SWITCHING CONTROL FUNCTION

BACKGROUND OF THE INVENTION

1. Field of the Invention

The present invention relates to an image forming apparatus and, more particularly, to an image forming apparatus having a cooling efficiency switching control function.

2. Description of the Related Art

Generally, when an original image is to be copied by use of an image forming apparatus such as an electronic copying apparatus, the image of the original is first exposed, after being placed on an original table, and is scanned by a light source such as an exposure lamp. Then, an image is formed on a photoconductive drum serving as an image carrier, and is developed by a developing unit utilizing a powder-form developer. Simultaneous with this operation (from exposure scanning to development), a copy sheet is fed from a feeding cassette mounted on the outside of the apparatus main body, the developed image being transferred to this copy sheet by a transfer unit or the like, and a predetermined heat and pressure being applied to the sheet in order to thermally fix the developer formed thereon. Thus, the copying process is completed, with the sheet bearing the image being discharged to an externally mounted receiving tray, and any developer remaining on the photoconductive drum being removed therefrom by a cleaning unit, a discharger, or the like.

When the copying process as described above is performed by an electronic copying apparatus, heat is generated by the exposure lamp, the fixing unit, and so on, leading to an increase in the temperature within the main body of the apparatus. In order to dissipate this heat to the outside of the main body, the apparatus is provided with an internal cooling fan. Depending on the termperature within the apparatus main body, the cooling fan is generally turned on/off or switched between high and low speeds so as to maintain the temperature therein within a predetermined temperature range.

A cooling fan which can be switched between high and low speeds can therefore be, at a given time, in one of three different states; namely, at a stop, rotating at low speed, or rotating at high speed, depending upon whether the temperature within the apparatus is at room temperature, at a "standby" temperature, i.e., the temperature at which copying becomes possible, or at a "saturated" temperature, respectively. The "saturated" temperature is defined as a predetermined temperature which is reached—but not exceeded—within the copying apparatus.

First, when the power source of the electronic copying apparatus is turned on, the temperature of the fixing unit therein rises from room temperature to a predetermined level, i.e. the standby temperature, as does also the copying apparatus itself. When the entire apparatus has warmed up to the standby temperature, copying then becomes possible and, in order to ensure that the original table, the surface of the photoconductive drum, and the like do not become excessively heated, the cooling fan begins low-speed rotation.

Subsequently, when copying is started, further heat is generated by the exposure lamp, the fixing unit, and the like, and is dissipated within the apparatus, consequently raising the temperature therein to the saturated temperature level. In response to this increase in heat level, the cooling fan is switched from low-speed to high-speed rotation. When a copying process is completed, the cooling fan is immediately switched from high-speed to low-speed rotation. However, although the heat generated in the apparatus is decreased, the heat accumulated in the apparatus is large, and the temperature in the apparatus is not immediately decreased but is decreased slowly to reach the standby temperature.

In the electronic copying apparatus having a cooling fan which is controlled in the above manner, the fan is rotated at a high speed only during the copying process, resulting in the following problems.

More specifically, when the first copying operation is completed and then the second copying is to be performed shortly after the first copying operation, the second copying operation is performed before the temperature in the apparatus is sufficiently decreased (before the temperature in the apparatus is decreased to the standby temperature). For example, assuming that the first copying operation is completed and the second copying operation is to be performed before the temperature in the apparatus is decreased from the saturated temperature to the standby temperature, the interior of the apparatus is kept at a high temperature for a long period of time since the temperature in the apparatus has not reached the standby temperature before the second copying operation. This is conspicuous when copying is intermittently performed within a short period of time, resulting in a long high-temperature state of the interior of the apparatus. This degrades the charging characteristics of the photoconductive drum and a stable image quality cannot be obtained.

SUMMARY OF THE INVENTION

Accordingly, it is an object of the present invention to provide an image forming apparatus having a cooling efficiency switching control function wherein even when copying is to be intermittently performed at short intervals, once a copying operation is completed, the temperature in the apparatus is decreased within a short period of time, so that the charging characteristics of a photoconductive drum are not degraded, thereby obtaining stable image quality.

According to one aspect of the present invention, there is provided an image forming apparatus comprising means for forming an image based on image data, the image forming means at least having a thermal source for substantially generating heat, means for forcibly releasing out of the apparatus heat which is generated by the thermal source and is accumulated due to the image forming means forming the image, means for detecting a temperature in the apparatus, means for switching a heat releasing rate of the heat releasing means between at least two level modes in accordance with a detected temperature obtained by the temperature detecting means, and means for driving the heat releasing means at the heat releasing rate selected by the switching means and controlling the temperature in the apparatus.

According to another aspect of the present invention, there is provided an image forming apparatus comprising means for forming an image based on image data, the image forming means at least having a thermal source for substantially generating heat, means for forcibly releasing out of the apparatus heat which is generated by the thermal source and is accumulated due to the image forming means forming the image, means for counting the time during which the releasing means is driven after an image formation, means for switching heat releasing rate of the heat releasing means between at least two levels or modes in accordance with a time obtained by the releasing means, and means for driving the heat releasing means in the mode having a higher cooling efficiency than the other of at least two modes during a time counted by the counting means, and controlling the temperature in the apparatus.

According to still another aspect of the present invention, there is provided an image forming apparatus comprising means for forming an image based on image data, the image forming means at least having a thermal source for substantially generating heat, means for forcibly releasing out of the apparatus heat which is generated by the thermal source when the image forming means forms the image, means for detecting a temperature in the apparatus, and means for switching the heat releasing rate of the heat releasing means between at least two levels or modes in accordance with a detected temperature obtained by the temperature detecting means, and means for driving the heat releasing means in a mode having a higher cooling efficiency than the other of the at least two modes when, due to successive image formation, the number of times of image formation exceeds a predetermined value to control the temperature in the apparatus.

BRIEF DESCRIPTION OF THE DRAWINGS

The manner in which the foregoing and other objects of the present invention are accompanying specification and claims considered together with the drawings, wherein:

DETAILED DESCRIPTION OF THE INVENTION

The preferred embodiments of the present invention will be described with reference to the accompanying drawings.

Figure 1:
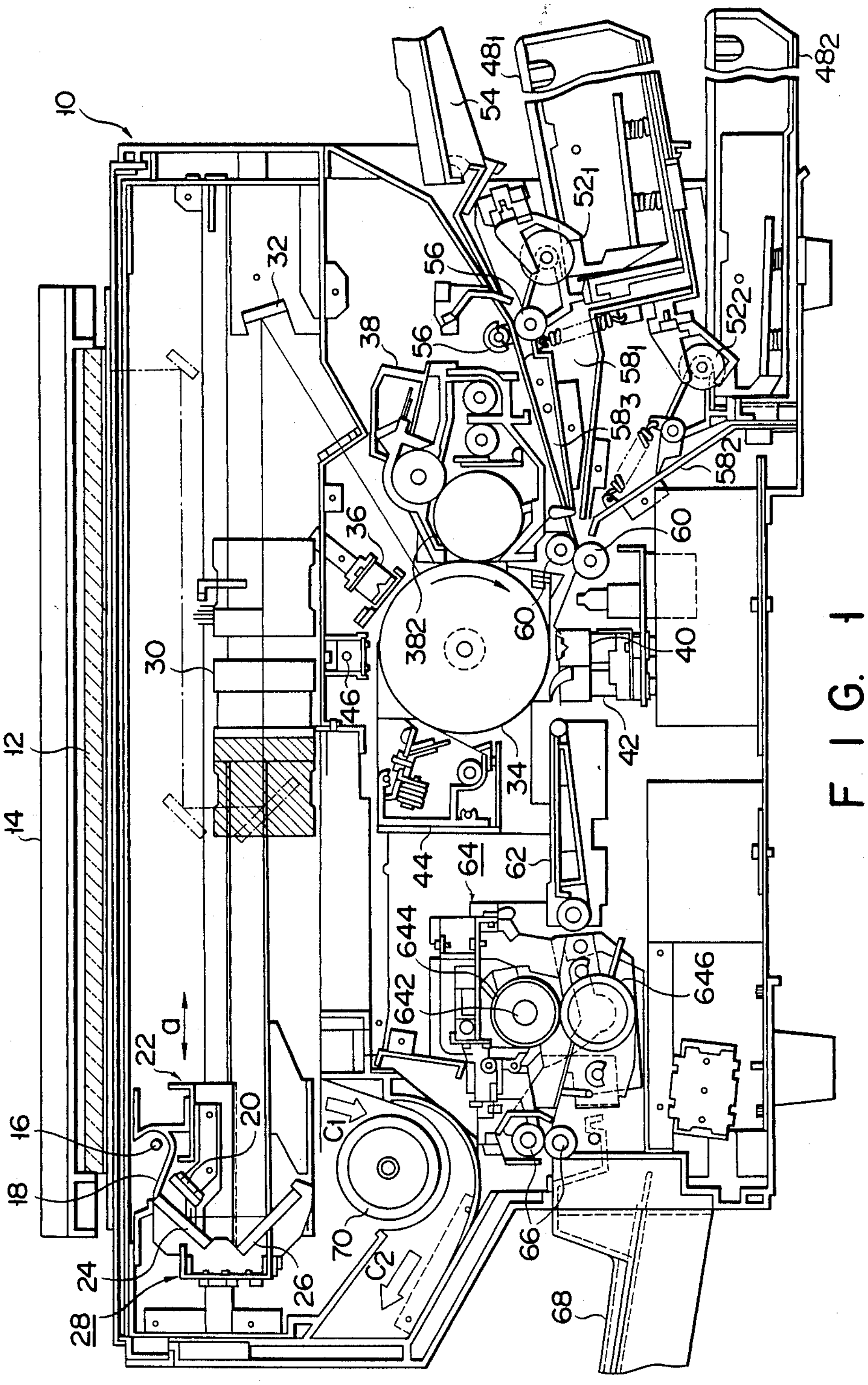
FIG. 1 is a side sectional view of an electronic copying apparatus to which the cooling system of the image forming apparatus according to the present invention is applied.

FIG. 1 is a side sectional view of an electronic copying apparatus to which a cooling system of an image forming apparatus according to the present invention is applied.

Original glass plate 12 is provided on the upper surface of main,.body, 10 of this electronic copying apparatus for placing places an original thereon. Cover, 14 which can be opened and closed, is mounted on the upper surface of original glass plate 12. First carriage 22 comprising exposure lamp 16, reflector 18, and first mirror 20 is provided inside main body 10 and under glass plate 12. Exposure lamp 16 serves as a light source for illuminating an original placed on glass plate 12. Reflector 18 reflects the light emitted by lamp 16. Mirror 20 reflects the light reflected by the original. First carriage 22 is slidably moved by a drive system (not shown) along the lower surface of glass plate 12 in the direction indicated by arrow a in FIG. 1.

Second carriage 28 comprising second and third mirrors 24 and 26 is provided in an upper portion of main body 10 to guide the light from first mirror 20. Second carriage 28 is slidable for a slidable range of and at a speed about ½ those of first carriage 22 in the direction of arrow a. The light from carriage 28 is guided to fourth mirror 32 through variable magnification lens 30 and reaches photoconductive drum 34 provided at a central portion of main body 10.

Photoconductive drum 34 is an image carrier for forming an image corresponding to the original and is rotatable in the direction of arrow b. Developing unit 38, transfer charger 40, separation charger 42, cleaning unit 44, discharge lamp 46, and the like are sequentially arranged around drum 34. Developing unit 38 has main charger 36 as a charging means, developing sleeve 382, and the like.

The arrangement of the lower portion of main body 10 is as follows. First and second sheet feeding cassettes $48_1$ and $48_2$ are mounted to main body 10 to be detachable from outside. Cassettes $48_1$ and $48_2$ respectively have cassette size detecting switches $50_1$ and $50_2$ for detecting the size of sheets placed in them. Sheets placed in cassettes $48_1$ and $48_2$ are fed by feeding rollers $52_1$ and $52_2$. Manual paper feed guide 54 is mounted on cassette $48_1$. A sheet placed on guide 54 is conveyed by a pair of manual paper feed rollers 56.

Sheet guiding paths $58_1$, $58_2$, and $58_3$ and a pair of register rollers 60 are provided to extend from cassettes $48_1$ and $48_2$ and guide 54 toward drum 34 in order to convey the sheets to drum 34.

On the sheet discharge side or the left side of photoconductive drum 34 of FIG. 1, conveyor belt 62, fixing unit 64 having heat-roller 644 incorporating heater lamp 642, press roller 646, and the like, and a pair of exit rollers 66 for discharging the sheet are sequentially arranged on the left side of separation charger 42. Receiving tray 68 for receiving a sheet discharged from exit rollers 66 is mounted on the outer side of main body 10. Cooling fan 70 is provided above exit rollers 66. Cooling fan 70 is used to dissipate the heat generated by the heat-generating source such as heater lamp 642 in fixing unit 64, exposure lamp 16, and the like to the outside of main body 10 in the directions indicated by arrows $c_1$ and $c_2$.

Figure 2:
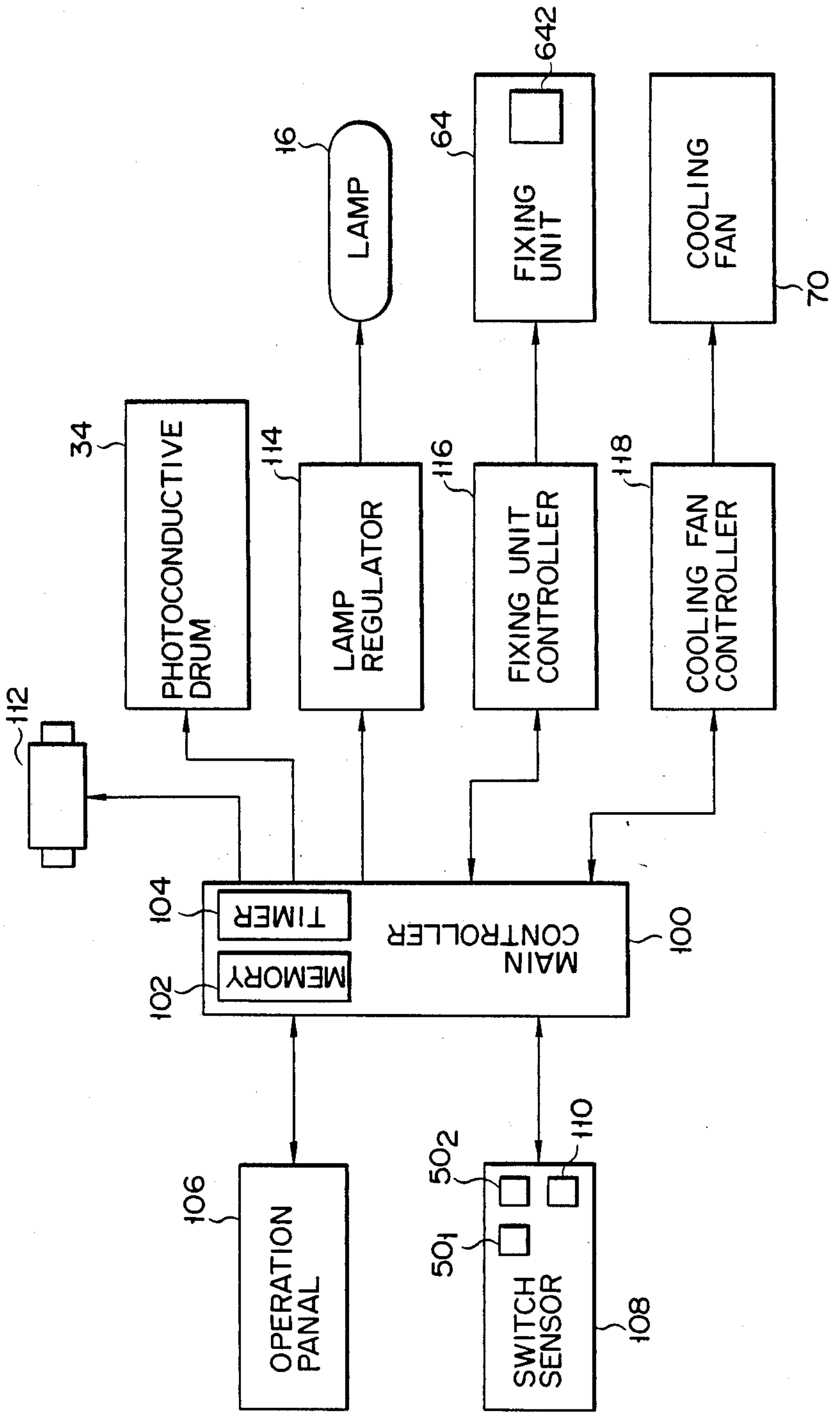
FIG. 2 is a block diagram schematically showing a control system.

FIG. 2 is a block diagram schematically showing the control system of the present invention. Main controller 100 controls the overall operation of this electronic copying apparatus and incorporates memory 102 and timer 104. Main controller 100 is coupled to operation panel 106 and switch sensor 108. Operation panel 106 serves as an input means for designating and inputting a copying operation of this copying apparatus. An input from panel 106 is controlled by controller 100. Switch sensor 108 comprises various types of switches and sensors, e.g., cassette size detecting switches $50_1$ and $50_2$, temperature sensor 110 to be described later, and so on. Main controller 100 is coupled to photoconductive drum 34 and solenoid 112 for driving developing sleeve 382 in developing unit 38 and a cleaning blade (not shown). Main controller 100 is also coupled to exposure lamp 16 through lamp regulator 114, fixing unit 64 having heater lamp 642 through fixing unit controller 116, and cooling fan 70 through cooling fan controller 118, and controls these sections. Lamp regulator 114 turns on/off exposure lamp 16. Fixing unit controller 116 and cooling fan controller 118 respectively control fixing unit 64 and cooling fan 70.

The operation of the electronic copying apparatus having the above arrangement will be described. Assume that the rotational mode of cooling fan 70 has three levels; stop (0), low speed (L), and high speed (H), and that the temperature in main body 10 of the copying apparatus (to be referred to as an internal temperature hereinafter) is classified into room temperature $T_A$, standby mode internal temperature (to be referred to as a standby temperature hereinafter) $T_R$, and saturated temperature $T_S$. Note that when the internal temperature is increased to reach a predetermined level and does not exceed the level, the internal temperature in this case is called saturated temperature $T_S$.

Figure 3A:
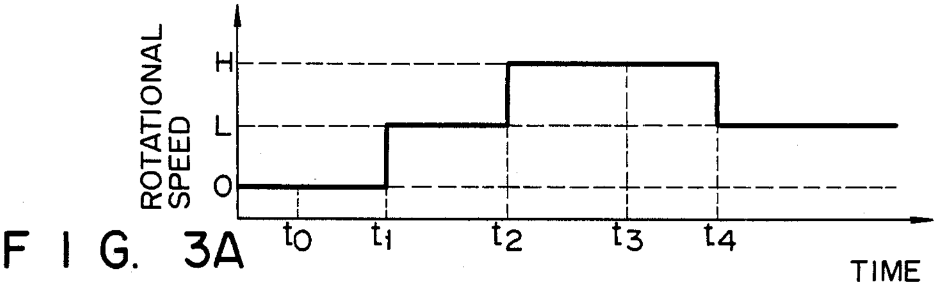
FIGS. 3A and 3B are timing charts showing a change over time of rotational mode of a cooling fan and a temperature in an apparatus according to a first embodiment of the present invention.
Figure 3B:
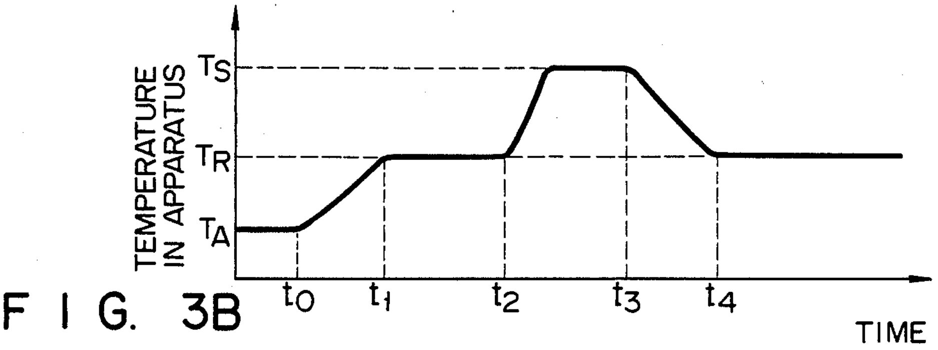
Figure 12:
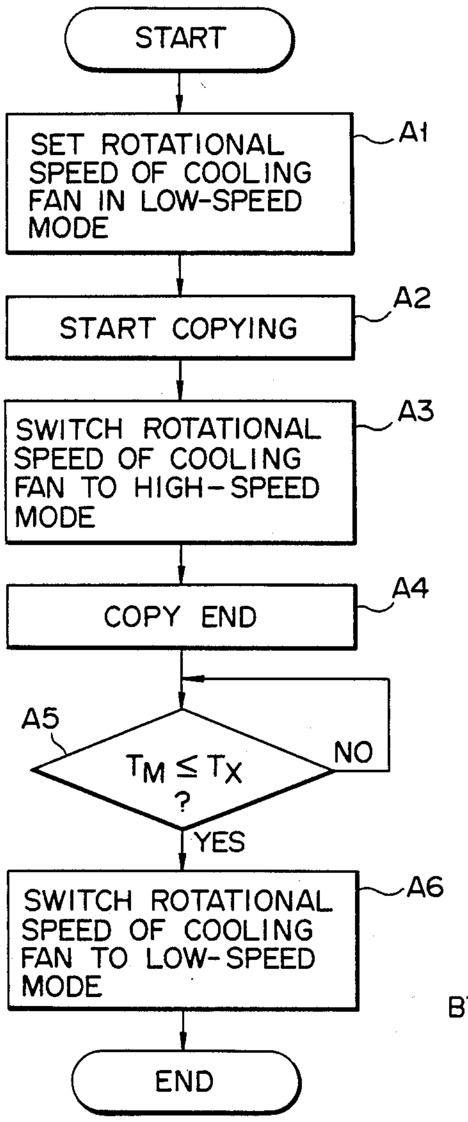
FIGS. 12 through 17 are flowcharts, respectively, for explaining the operation of the cooling fan.

First, a first embodiment of the present invention will be described with reference to FIGS. 1 and 2, the timing charts of FIGS. 3A and 3B, and the flowchart of FIG. 12. When the power source switch (not shown) is turned on at time $t_0$, main controller 100 supplies instructions to exposure lamp 16 (lamp regulator 114) as the exposure means, photoconductive drum 34 as an image forming means, developing unit 38 (solenoid 112), and fixing unit 64 (fixing unit controller 116) as a fixing means to enable copying. Lamp 16, drum 34, developing unit 38, and fixing unit 64 constitute a copying means. Heater lamp 642 in fixing unit 64 is heated by controller 116. Accordingly, the internal temperature is increased from room temperature $T_A$ to standby temperature $T_R$. Cooling fan 70 is not yet driven.

When warming up is completed to enable copying at time $t_1$, cooling fan 70 is started to be driven so as not to excessively heat original table 12 or the surface of drum 34. More specifically, at time $t_1$, cooling fan 70 is operated under the control of main controller 100 and cooling fan controller 118, and cooling fan 70 is started to be driven in the low-speed (L) mode (step A1). While cooling fan 70 is rotated in the low-speed mode, as in this case, the internal temperature is maintained at standby temperature $T_R$.

At time $t_2$, when an original is placed on original glass plate 12, cover 14 is closed, and a copy start key (not shown) on operation panel 106 is depressed, copying is started (step A2). In other words, first carriage 22 comprising exposure lamp 16 and the like is started to move in the direction of arrow a (FIG. 1). At the same time, second carriage 28 comprising second and third mirrors 24 and 26 is also moved in the direction of arrow a at a speed about ½ that of first carriage 22. In synchronism with the motion of first and second carriages 22 and 28, scanning light is emitted by exposure lamp 16 onto the original under the control of lamp regulator 114. The scanning light radiates photoconductive drum 34 through first, second, and third mirrors 20, 22, and 24, variable magnification lens 20, and fourth mirror 32. Drum 34 is uniformly charged in advance by main charger 36. A latent image is formed on drum 34 in accordance with the scanning light.

The developer charged by developing unit 38 reaches a portion opposing the latent image formed on the surface of drum 34 rotating in the direction of arrow b in FIG. 1. The developer stacked to a desired thickness in developing unit 38 continuously flies onto drum 34 to develop the image formed on it.

At the time of copy start described above, a sheet is fetched by feeding roller $50_1$ and the like from, e.g., first sheet feeding cassette $48_1$. The sheet is fed to transfer charger 40 through sheet guiding path $58_1$ and the pair of register rollers 60 in synchronism with driving of photoconductive drum 34. The formed image is transferred onto the sheet by transfer charger 40. After image transfer, the sheet is separated from drum 34 by separation charger 42. Then, the sheet is conveyed to fixing unit 64 through conveyor belt 62. The image is fixed by fixing unit 64.

During the copying operation of the above copying means (from time $t_2$ to $t_3$), in order to dissipate the heat generated by exposure lamp 16 and heater lamp 642 in fixing unit 64 to the outside of main body 10 and to cool the interior of the apparatus, cooling fan 70 must be operated. More specifically, the rotational speed of cooling fan 70 as the cooling means is switched from the low-speed (L) mode to high-speed (H) mode by main controller 100 and cooling fan controller 118 and cooling fan 70 rotates in the high-speed (H) mode (step A3). The sheet, on which the image is fixed with fixing unit 64, is discharged to receiving tray 68 through the pair of exit rollers 66, and the copying operation is completed at time $t_3$ (step A4). After an image is transferred from photoconductive drum 34 to the sheet, some developer remains on drum 34. The remaining developer is cleaned with cleaning unit 44. The residual charges on drum 34 are discharged by discharge lamp 46, and the apparatus is set in the initial state.

Assume that temperature sensor 110, such as a known bimetal system or a thermostat, is provided at a predetermined portion of main body 10; that cooling fan controller 118 comprises a controller for switching the cooling capacity mode (high-/low-speed rotation) of cooling fan 70 in accordance with the temperature detected by sensor 110; and that the set temperature of temperature sensor 110 for operating the controller is $T_X$ and the internal temperature of main body 10 is $T_M$. Set temperature $T_X$ of sensor 110 and internal temperature $T_M$ of main body 10 are compared in step A5. When internal temperature $T_M$ is higher than set temperature $T_X$ ($T_M > T_X$), the high-speed (H) rotation of cooling fan 70 is maintained by cooling fan controller 118 (time $t_3$ to $t_4$). When $T_M \leqq T_X$ ($t_4$), controller 1 switches the rotational speed of cooling fan 70 to the low-speed (L) mode (step A6).

In this manner, after time $t_4$, cooling fan 70 is operated in the low-speed (L) mode until a copying operation is performed again or the power source is turned off.

When the copying operation is completed, cooling fan 70 is operated in the high-speed mode by temperature sensor 110 and cooling fan controller 118 until the internal temperature of main body 10 reaches a predetermined temperature. Therefore, the internal temperature after the copying operation is quickly decreased. Even if intermittent copying operations are performed at short intervals, the interior of the apparatus is not excessively heated.

In this embodiment, set temperature $T_X$ of temperature sensor 110 is the same as internal temperature $T_R$ in the standby mode. However, the present invention is not limited to this. The temperature can be arbitrarily set In this embodiment, the sheet is fetched from first sheet feeding cassette $48_1$. However, when the sheet is fed from second sheet feeding cassette $48_2$ or from manual paper feed guide 54, only the reference numbers of the rollers and the like having the above functions are changed, and the same operation as described above is performed.

Figure 4A:
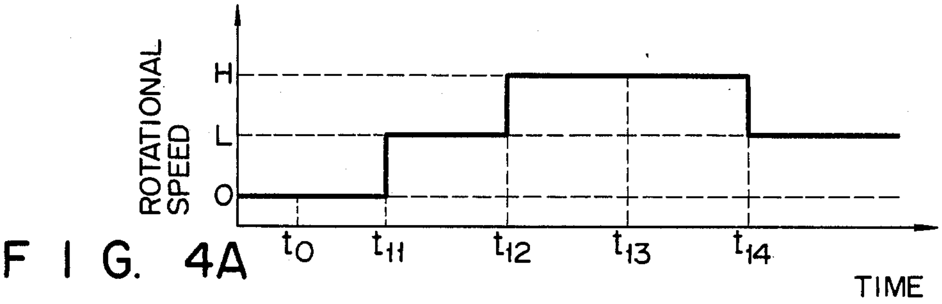
FIGS. 4A and 4B are timing charts showing a change over time of rotational mode of a cooling fan and a temperature in an apparatus according to a second embodiment of the, present invention.
Figure 13:
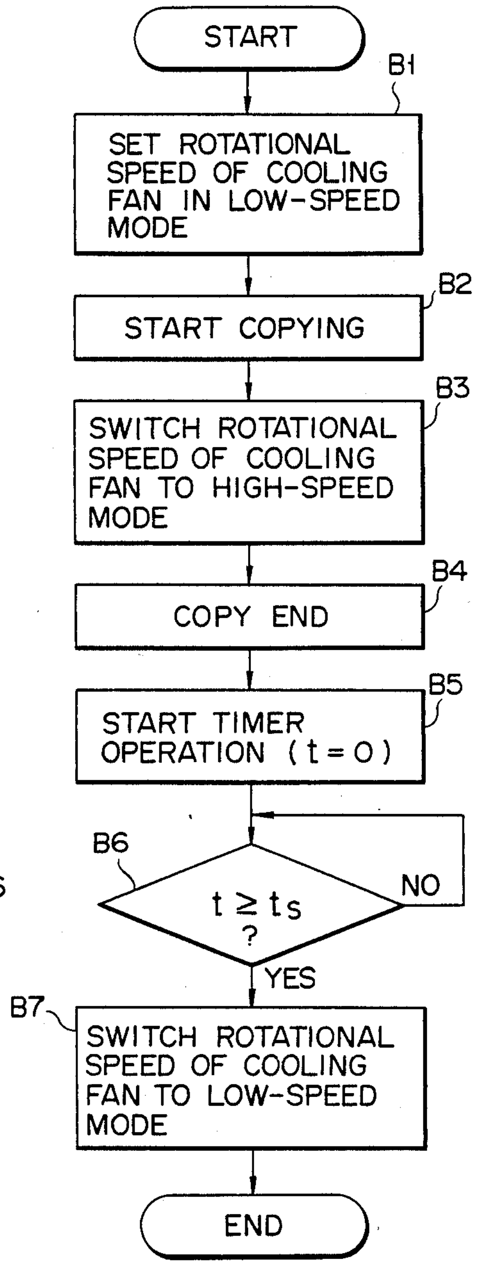

A second embodiment of the present invention will be described with reference to the timing charts shown in FIGS. 4A and 4B and the flowchart of FIG. 13.

The second embodiment is different from the first embodiment only in function of cooling fan controller 118. Excluding that, the copying operation, function, and the like of the apparatus are the same as in the first embodiment and a detailed description thereof is omitted.

In the second embodiment, when the power source is turned on at time $t_0$, the internal temperature of the electronic copying apparatus is increased from room temperature $T_A$ to standby temperature $T_R$ and the warming up is completed at time $t_{11}$. At this time, cooling fan 70 is started to rotate in the low-speed (L) mode by cooling fan controller 118 (step B1). Then, the copying operation is started at time $t_{12}$ (step B2), and copying is performed until time $t_{13}$ in the same manner as described in the first embodiment of the present invention. In this case, cooling fan 70 is switched to the high-speed (H) mode (step B3) by controller 118 and the internal temperature reaches saturated temperature $T_S$. When the copying operation is completed at time $t_{13}$ (step B4), cooling fan controller 118 causes timer 104 in main controller 100 to start counting time t elapsed after the copying operation completion (step B5). Lapse time t is compared with preset time $t_s$ (e.g., 1 minute) (step B6). Cooling fan 70 is maintained in the high-speed mode by controller 118 until preset time $t_s$ elapses ($t_{13}$ to $t_{14}$). As a result, the internal temperature is gradually decreased from saturated temperature $T_S$. When time t set in timer 104 elapses ($t_{14}$), cooling fan 70 is switched to the low-speed mode by controller 118 (step B7).

Figure 4B:
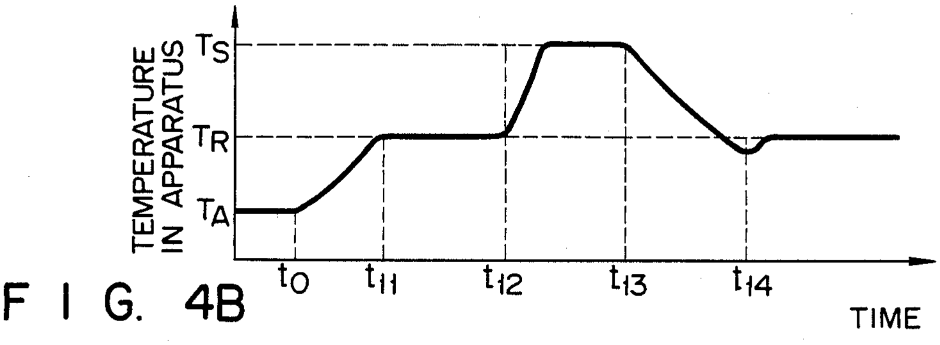

The internal temperature after a copying operation is not necessarily equal to standby temperature $T_R$, as shown in FIG. 4B. The internal temperature is changed when preset time $t_s$, the ambient temperature, the number of continuous copies currently obtained, and the like are changed.

In this manner, when the rotational mode of cooling fan 70 is controlled using timer 104, no special detecting means or logic circuit need to be provided, and the object of the present invention can be achieved quite simply and easily.

In the first and second embodiments described above, cooling fan 70 is set in the high-speed mode regardless of the number of sheets to be copied or the time required for copying. In the following third embodiment, when the copying apparatus performs a continuous copying operation, the number of sheets to be copied is set and the set number and the high-speed mode of cooling fan 70 are related to each other.

More specifically, cooling fan 70 must be maintained in the high-speed mode especially when the apparatus has been performing a continuous copying operation and the internal temperature has been increased. When the number of sheets to be copied is small (e.g., 1 to 5 or 6), the temperature rise in the apparatus is small. In this case, the high-speed rotation of cooling fan 70, as in the second embodiment, is not sometimes needed. Therefore, predetermined number $N_0$ (e.g., 20) of sheets is stored in memory 102 in main controller 100, and cooling fan 70 is maintained in the high-speed mode only when the number of sheets actually copied exceeds set number $N_0$.

Figure 5:
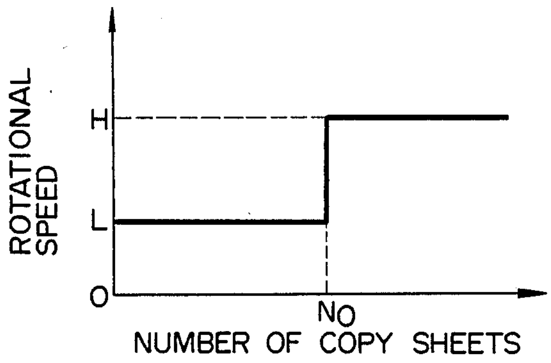
FIG. 5 shows the relationship between the rotational mode of a cooling fan and the number of sheets to be copied according to a third embodiment of the present invention.
Figure 14:
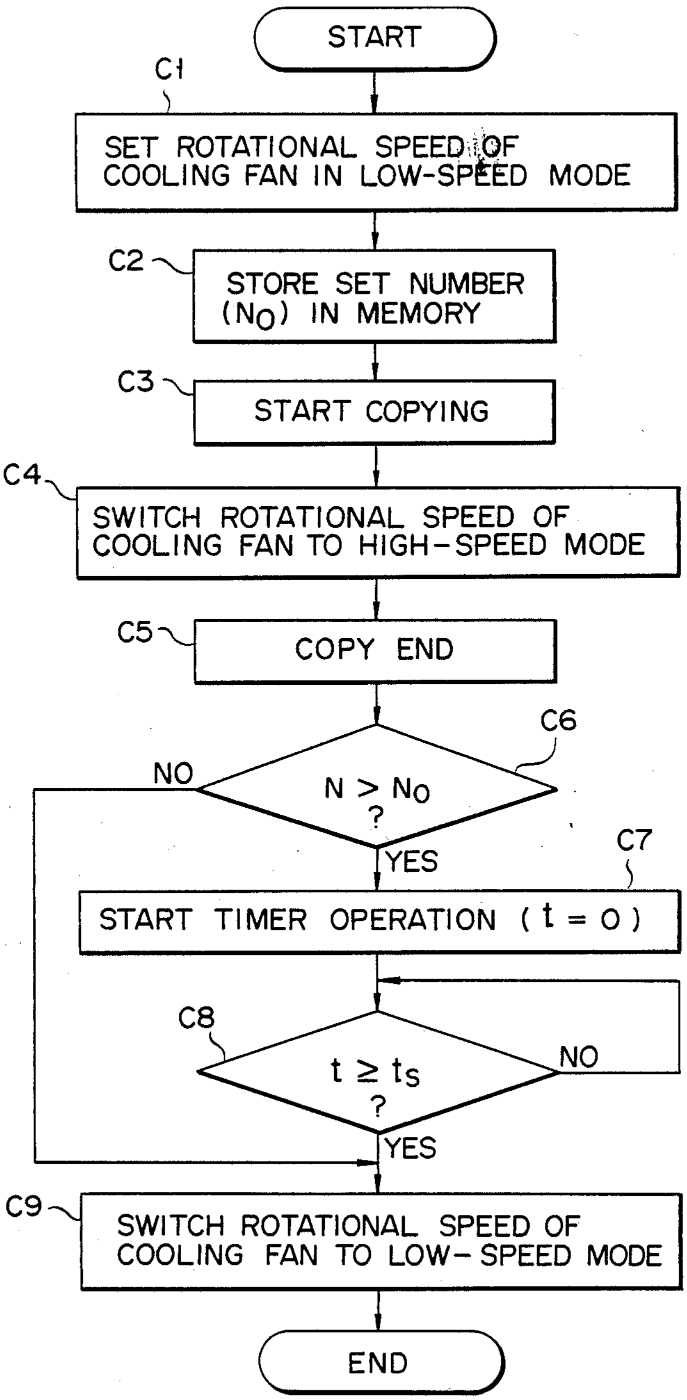

Referring to FIG. 5 and the flowchart of FIG. 14, when a continuous copying operation is to be performed, cooling fan 70 is set in the low-speed (L) mode to enable continuous copying in step Cl, and predetermined number $N_0$ (e.g., 20) of sheets is stored in memory 102 in step C2. Set number $N_0$ is entered by the number set keys (not shown) of operation panel 106 through main controller 100. The copying operation is started in step C3 and cooling fan controller 118 switches cooling fan 70 from the low-speed (L) to high-speed (H) mode (step C4). Subsequently, the continuous copying operation is completed in step C5. Preset and copied number N of sheets is compared with set number $N_0$ in step C6.

If $N \leqq N_0$, the flow advances to step C9 to be described later and cooling fan controller 118 switches cooling fan 70 from the high-speed (H) mode to low-speed (L) mode. However, if $N > N_0$ in step C6, the flow advances to step C7 to start counting of timer 104. Timer 104 serves to count time t elapsed after the copying operation completion. Lapse time t is compared with preset time $t_s$ in step C8. If $t > t_s$ in step C8, the flow advances to step C9 to switch cooling fan 70 from the high-speed (H) to low-speed (L) mode.

In this manner, when the high-speed mode of cooling fan 70 is maintained only when the number of continuously copied sheets exceeds a predetermined set number ($N_0$), excessive cooling by cooling fan 70 can be prevented.

Set number $N_0$ and set time $t_s$ described in this embodiment can be arbitrarily, easily changed by the operator or a maintenance personnel. These variables can be switched by means of switching the corresponding constants of the main controller logic circuits in accordance with known techniques, The constants of the logic circuits can be inputted and changed in the adjustment mode through the number set keys (not shown) on operation panel 106 in accordance with known techniques.

The internal temperature during copying operation is increased along with the continuous copying operation. Therefore, the internal temperature immediately after the copying operation is a function of the set number of sheets copied by the continuous copying operation.

Figure 6:
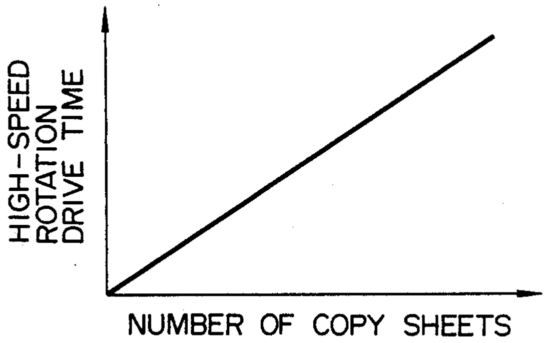
FIG. 6 shows the relationship between the high-speed rotation drive time of a cooling fan and the number of sheets to be copied according to a fourth embodiment of the present invention.

If the increase in internal temperature is proportional to the number of sheets continuously copied, the high-speed mode time of cooling fan 70 may be maintained in proportion to the number of copied sheets, as shown in FIG. 6.

Figure 15:
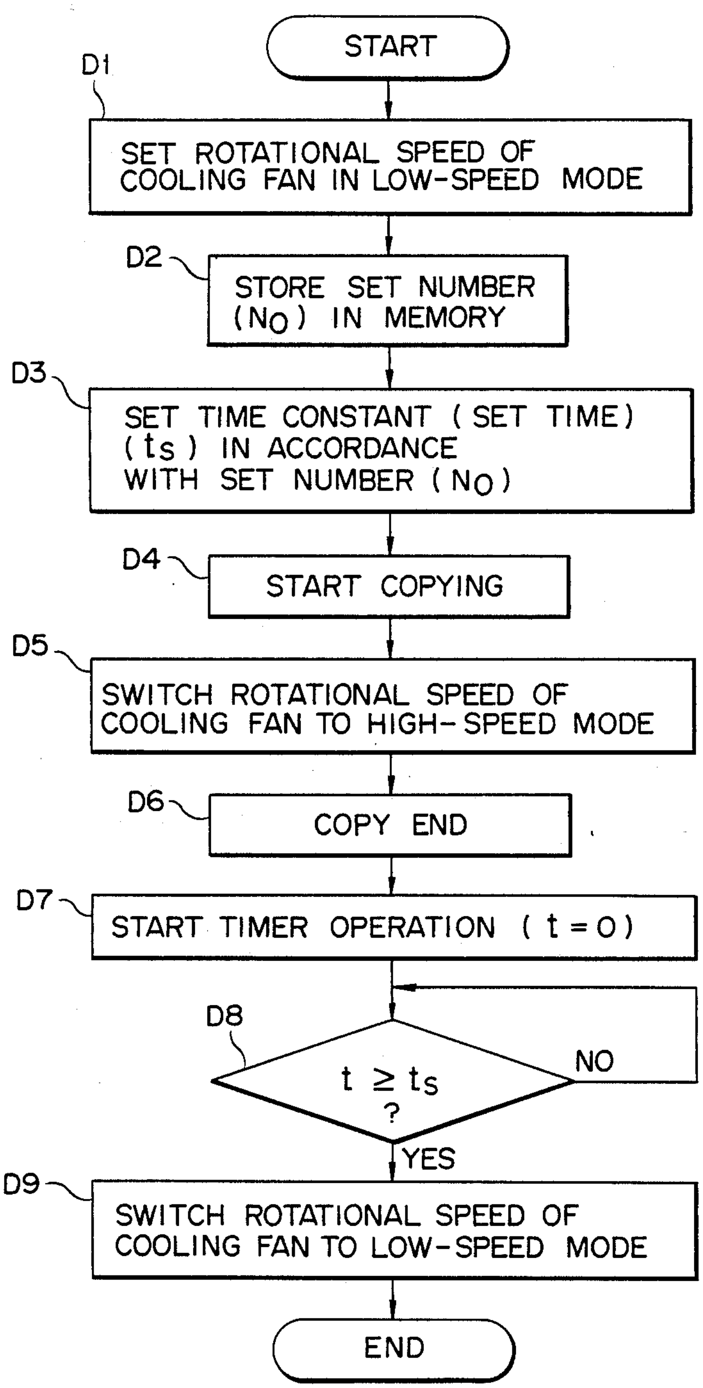

A fourth embodiment of the present invention will be described with reference to the flowchart of FIG. 15. Cooling fan 70 is set in the low-speed (L) mode in step D1 to enable copying. Then, in step D2, predetermined number $N_0$ of sheets to be copied is stored in memory 102. A time constant (set time) in accordance with set number $N_0$ is set in step D3. Note that $t_s$ is the product of number N of sheets to be copied and time $t_c$ of the copying operation required for copying a unit number of sheets ($t_s = N \times t_c$). Copying is started in step D4. The flow advances to step D5 to switch cooling fan 70 from the low-speed (L) to high-speed (H) mode by cooling fan controller 118. Thereafter, when the copying operation is completed in step D6, timer 104 starts counting in step D7. When it is determined in step D8 that elapsed time t counted by timer 104 is shorter than set time $t_s$, the high-speed mode of cooling fan 70 is maintained. When $t \geqq t_s$, the flow advances to step D9 to switch cooling fan 70 from the high-speed (H) to low-speed (L) mode by controller 118.

In this manner, when the high-speed mode of cooling fan 70 is maintained for a period of time proportional to the number of sheets to be copied, the internal temperature increased in accordance with the number of obtained copies is reduced in accordance with the mode of fan 70 driven in accordance with the number of copies, and the internal temperature is lowered to an appropriate level.

Upon a continuous copying operation described above, the temperature in the electronic copying apparatus is not increased infinitely but is saturated at a predetermined level. Although a saturated temperature is influenced by the environmental conditions such as the location of the electronic copying apparatus, the ambient temperature, and the like, it can be considered substantially constant. A cooling time required for decreasing the temperature from the saturated temperature to the ordinary internal temperature in the standby mode is also considered substantially constant. Therefore, a time required for decreasing the internal temperature to the ordinary standby temperature after a continuous copying operation is performed to obtain a number of copies exceeding a predetermined number is substantially constant.

Figure 7:
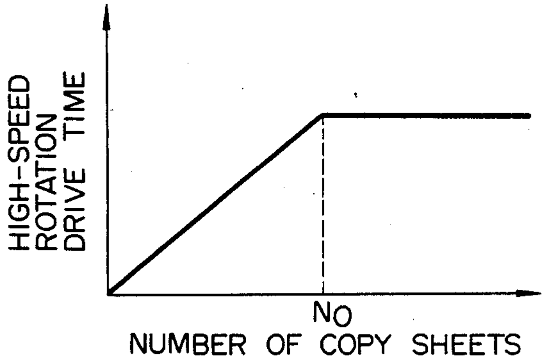
FIG. 7 shows the relationship between the high-speed rotation drive time of the cooling fan and the number of sheets to be copied when the saturated temperature is considered in the apparatus according to the fourth embodiment.

In FIG. 7, the saturated temperature as described above is considered. The high-speed rotation drive time of cooling fan 70 after the copying operation completion is regarded as a function of the number of sheets to be copied. When the number of sheets to be copied exceeds a predetermined number, the function becomes constant. For example, referring to the flowchart of FIG. 15, assume that set number $N_0$ in steps D2 and D3 is 20. The high-speed rotation drive time of cooling fan 70 determined in steps D7 and D8 is as follows. Namely, when the number of sheets to be continuously copied is 20 or less, the high-speed rotation drive time of cooling fan 70 after the copying operation is set to be proportional to this number. In contrast to this, when the number of sheets to be continuously copied exceeds 20, the cooling time is set to be substantially constant as in the above case. The cooling time in this case is determined by preset time $t_s$.

Figure 8:
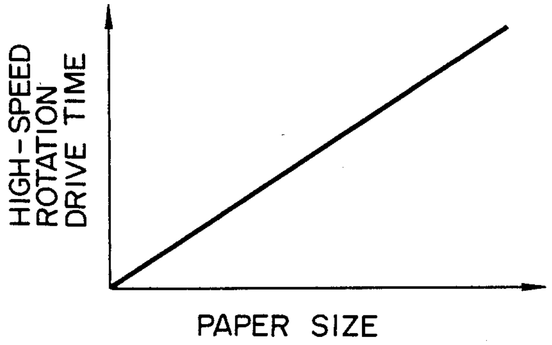
FIG. 8 shows the relationship between the high-speed rotation drive time of the cooling fan and the size of the copy sheet according to a fifth embodiment of the present invention.

In the fourth embodiment, the high-speed rotation drive time of cooling fan 70 is maintained in proportion to the number of sheets to be copied. However, it can be proportional to the size of the copy sheet, as shown in FIG. 8. In this case, when the size of the copy sheet is changed, the copying operation time is changed. Thus, the temperature rise in the apparatus is no longer a function only depending on the number of sheets to be copied.

Figure 16:
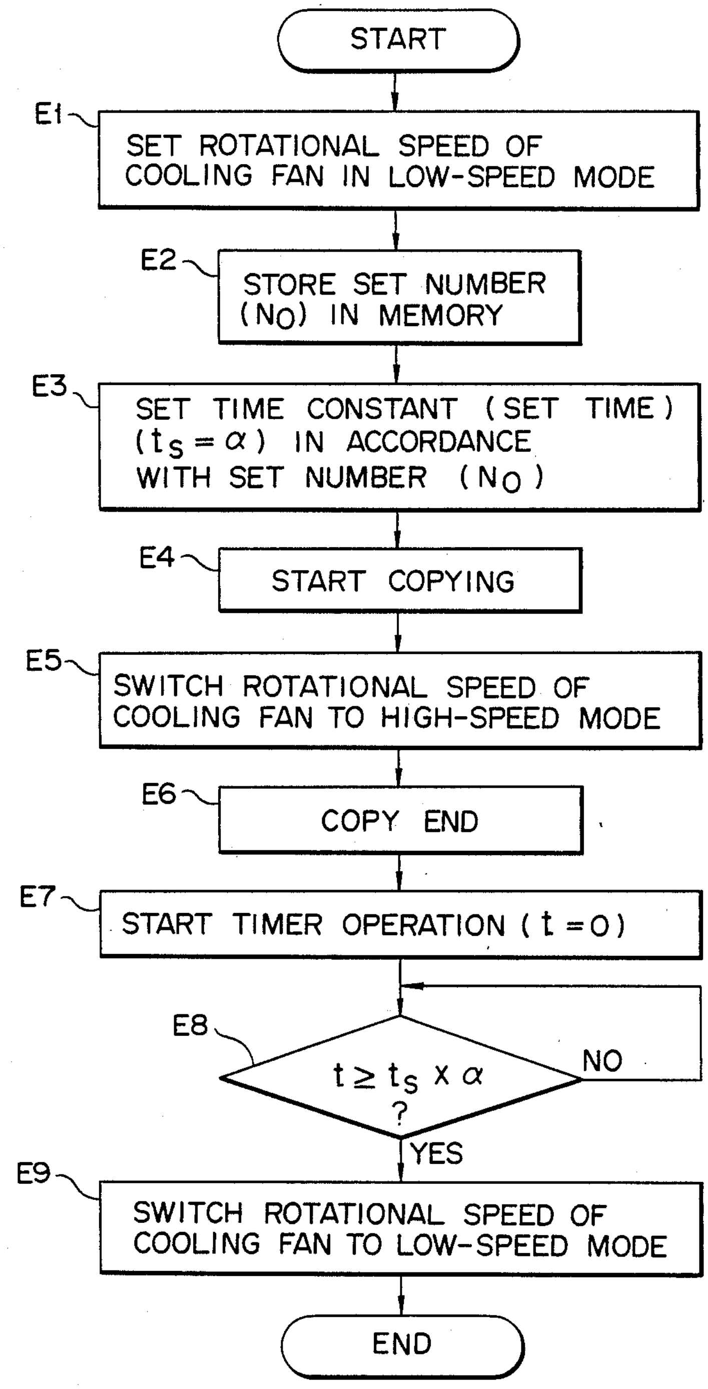

More specifically, in the fifth embodiment referring to the flowchart of FIG. 16, the copying operation is started, cooling fan 70 is set in the low-speed mode to enable copying in step El, and predetermined set number $N_0$ is stored in memory 102 in step E2. Time constant (set time) $t_s \times \alpha$ in accordance with set number $N_0$ is set in step E3, where ts is the product of the number N of sheets to be copied, time $t_c$ of the copying operation required for copying a unit number of sheets and o is a predetermined correction coefficient in accordance with the size of the copy sheet ($t_s = t_c \times N \times \alpha$). For example, assuming that lateral feed copying of an A4 size sheet is taken as a reference, correction coefficient $\alpha$ is about 2 when an A3 size sheet is used for copying. Subsequently, copying is started in step E4, and the flow advances to step E5 to switch cooling fan 70 from the low-speed to high-speed mode by cooling fan controller 118. Thereafter, when the copying operation is completed in step E6, timer 104 starts counting in step E7. When it is determined in step E8 that elapsed time t of timer 104 is shorter than set time $t_s \times \alpha$ the high-speed mode of cooling fan 70 is maintained. When $t \geqq t_s \times \alpha$ the flow advances to step E9 to switch the rotational speed of cooling fan 70 from the high-speed to low-speed mode by controller 118.

In this manner, when the high-speed mode of cooling fan 70 is maintained for a period of time proportional to the size of a copy sheet, the internal temperature which increases in accordance with the number of sheets to be copied is reduced in the high-speed mode driven in accordance with the size of the copy sheet. Therefore, the internal temperature is decreased to an appropriate level.

In the fifth embodiment of the present invention, the internal temperature of the electronic copying apparatus is not infinitely increased, but is saturated at a certain predetermined level in the same manner as in the fifth embodiment. Therefore, when the size of the copy sheet exceeds a certain copy sheet size, a time required for reducing the internal temperature down to an ordinary standby temperature after a continuous copying operation is substantially constant.

Figure 9:
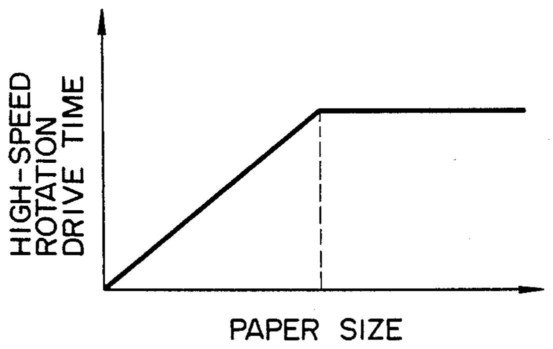
FIG. 9 shows the relationship between the high-speed rotation drive time of the cooling fan and the size of the copy sheet when the saturated temperature is considered in the apparatus according to the fifth embodiment.

In FIG. 9, the saturated temperature as described above is considered. The high-speed rotation drive time of cooling fan 70 after copying operation completion is taken as a function of the size of a copy sheet. In FIG. 9, when the size of the copy sheet exceeds a predetermined size (e.g., A3 size), the value of the function becomes constant.

Figure 10:
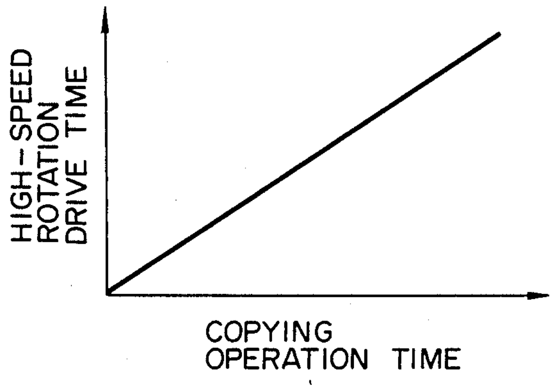
FIG. 10 shows the relationship between the high-speed rotation drive time of a cooling fan and the copying operation time according to a sixth embodiment of the present invention.

In the fourth embodiment, the high-speed mode of cooling fan 70 is maintained for a period of time in proportion to the number of sheets to be copied. However, as shown in FIG. 10, the high-speed mode of fan 70 can be maintained for a period of time in proportion to a period of time from the beginning to completion of a copying operation, i.e., the copying operation time.

Figure 17:
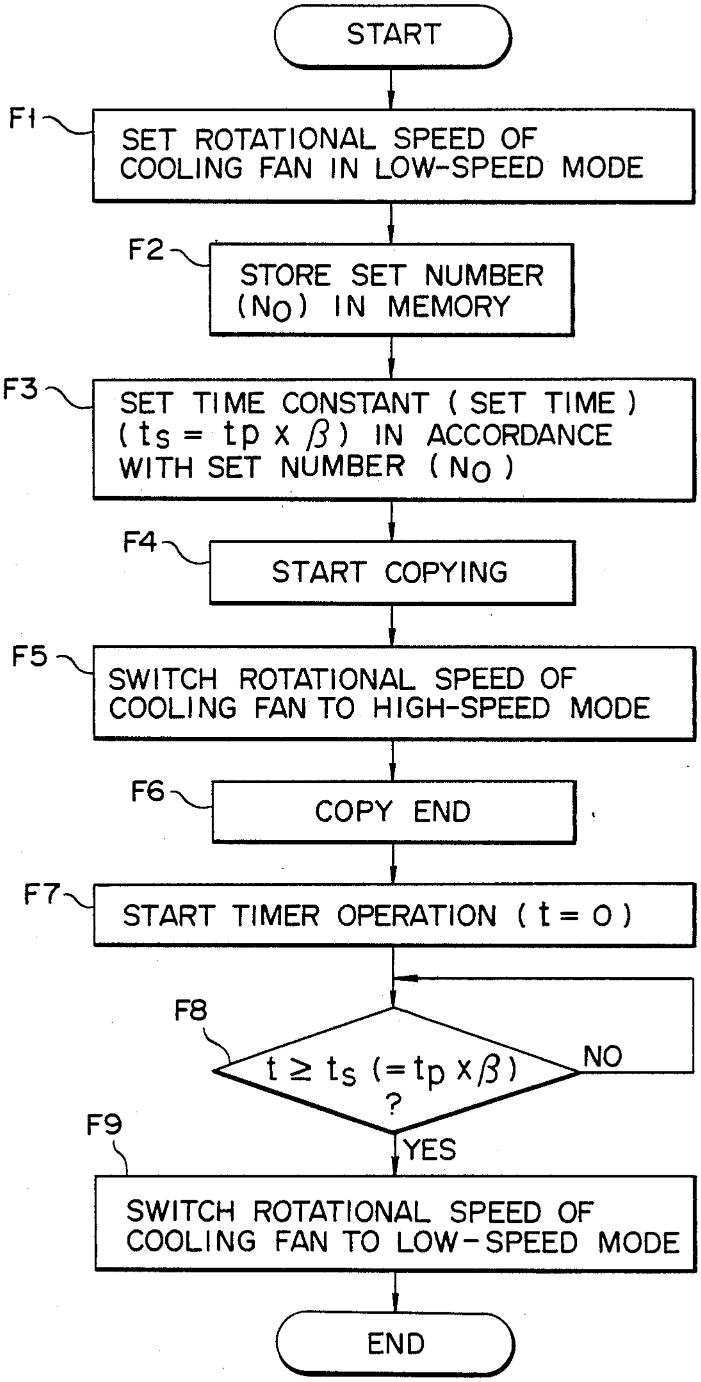

A sixth embodiment of the present invention will be described with reference to the flow chart of FIG. 17. The copying operation is started, and cooling fan 70 is set in the low-speed mode to enable copying in step F1. Subsequently, predetermined set number $N_0$ of sheets to be copied is stored in step F2. Time constant (set time) $t_s = t_p \times \beta$ in accordance with set number $N_0$ is set in step F3, where $t_p$ is the copying operation time and $\beta$ is a predetermined correction coefficient. Then, copying is started in step F4 and cooling fan 70 is switched from the low-speed to high-speed mode in step F5 by cooling fan controller 118. When the copying operation is completed in step F6, timer 104 starts counting in step F7. When it is determined in step F8 that elapsed time t of timer 104 is shorter than set time $t_s$ $(= t_p \times \beta)$, the high-speed mode of fan 70 is maintained. When $t \geqq t_s$, the flow advances to step F9 to switch cooling fan 70 from the high-speed to low-speed mode by controller 118.

In this manner, when the high-speed mode of cooling fan 70 is maintained for a period of time in proportion to the copying operation time, the internal temperature which is increased in accordance with the number of obtained copies is decreased in the high-speed mode driven in accordance with the copying operation time. Therefore, the internal temperature is decreased down to an appropriate level.

In the sixth embodiment, the internal temperature of the electronic copying apparatus is saturated at a certain predetermined level in the same manner as in the fourth and fifth embodiments described above. Therefore, when a copying operation time exceeds a predetermined time, a time required for reducing the internal temperature down to an ordinary standby temperature after a continuous copying operation is substantially constant.

Figure 11:
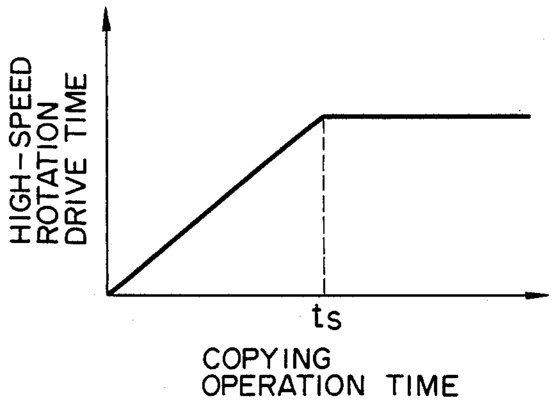
FIG. 11 shows the relationship between the high-speed rotation drive time of the cooling fan and the copying operation time when the saturated temperature of the apparatus is considered according to the sixth embodiment of the present invention.

In FIG. 11, the saturated temperature as described above is considered. The high-speed rotation drive time of cooling fan 70 after copying operation completion is taken as a function of the copying operation time. When the copying operation time exceeds a predetermined time (e.g., 5 minutes), the value of the function becomes constant.

In this manner, when the temperature rise in the electronic copying apparatus is taken as a function in proportion to the number or size of copy sheets or a copying operation time, the drive time of the cooling fan in the high-speed mode is set. Therefore, the internal temperature of the apparatus is decreased down to an appropriate level within an appropriate length of time.

Note that set number $N_0$ of sheets, time constants $t_s$ and $t_c$, and correction coefficients $\alpha$ and $\beta$ are arbitrarily variable.

As described above, according to the present invention, even when copying is performed intermittently at short intervals, after each copying operation is completed, a cooling fan is driven at a high speed for a predetermined period of time in order to decrease the temperature without maintaining it at a high temperature for a long period of time. Therefore, the internal temperature of the apparatus can be quickly decreased. As a result, the charging characteristics of the photoconductive drum may not be degraded by the high temperature to provide a long service life, resulting in a stable image quality.

In the embodiment described above, the rotation of the cooling fan can be switched between high- and low-speed modes. However, the present invention is not limited to this. The cooling fan can have only a single rotation speed level by turning on/off or the like as long as the rotation speed is different between copying and non-copying intervals.

What is claimed is:

1. An image forming apparatus comprising:

means for forming an image based on image data, said image forming means having at least a thermal source for generating heat;

means for forcibly expelling from said apparatus the heat which is generated by the thermal source and which accumulates as a result of said image forming means forming an image;

means for detecting the temperature within said apparatus;

means for switching the heat releasing rate of said heat expelling means between at least two level modes, in accordance with the temperature detected by said temperature detecting means, including at times after copying operation is completed; and means for driving said heat releasing means at the heat releasing rate selected by said switching means and controlling the temperature within said apparatus.

2. An apparatus according to claim 1, wherein said temperature detecting means detects the temperature within said apparatus in accordance with selected set temperature, thereby causing said switching means to switch said heat expelling means between said at least two level modes, and to control the temperature within said apparatus.

3. An apparatus according to claim 2, wherein said set temperature is a saturated temperature within said apparatus, which temperature is increased and saturated when image forming is performed continuously.

4. An apparatus according to claim 3, wherein said switching means switches said heat expelling means between two level modes, said modes being a stop mode and a rotation mode, to control the temperature within said apparatus.

5. An apparatus according to claim 3, wherein said switching means switches said heat expelling means between two level modes, said modes being a high-speed and a low-speed rotation mode, to control the temperature within said apparatus.

6. An image forming apparatus comprising:

means for forming an image based on image data, said image forming means at least having a thermal source for substantially generating heat;

means for forcibly releasing out of said apparatus heat which is generated by the thermal source and which accumulates as a result of said image forming means forming an image;

means for counting a time during which said releasing means is driven after formation of an image;

means for switching a heat releasing rate of said heat releasing means between at least two level modes, in accordance with a time counted by said time counting means; and means for driving said heat releasing means in a mode having a higher cooling efficiency than any other of said level modes, during a time counted by said counting means, and controlling the temperature within said apparatus.

7. An apparatus according to claim 6, wherein the time counted by said counting means is set at a predetermined length.

8. An apparatus according to claim 6, wherein the time counted by said counting means can be changed.

9. An apparatus according to claim 8, wherein the time counted by said counting means is indicated as a function of a set value representing the number of times image formation is performed within one image forming operation.

10. An apparatus according to claim 8, wherein the time counted by said counting means is indicated as a function of both a set value representing the number of times image formation is performed within one image forming operation and the size of a document constituted by said image data.

11. An apparatus according to claim 8, wherein the time counted by said counting means is indicated as a function of an image formation time required for continuous image formation.

12. An apparatus according to claim 8, wherein the time counted by said counting means is indicated as a function of a set value representing the number of times image formation is performed within one image forming operation and becomes constant when the time counted exceeds the set number of times.

13. An apparatus according to claim 8, wherein the time counted by said counting means is a function of both a set value representing the number of times image formation is performed within one image forming operation and the size of a document constituted by said image data, and becomes constant when the function of both the set number of times and the size of said document exceed predetermined values.

14. An apparatus according to claim 8, wherein the time counted by said counting means is indicated as a function of an image formation time required for continuous image formation and becomes constant when the function of the image formation time exceeds a predetermined value.

15. An apparatus according to claim 8, wherein said switching means switches said heat releasing means between two level modes, said modes being a stop mode and a rotation mode, to control the temperature within said apparatus.

16. An apparatus according to claim 8, wherein said switching means switches said heat releasing means between two level modes, said modes being a low-speed and a high-speed rotation mode, to control the temperature within said apparatus.

17. An image forming apparatus comprising:

means for forming an image based on image data, said image forming means having at least a thermal source for generating heat;

means for forcibly expelling from said apparatus heat which is generated by the thermal source when said image forming means forms an image;

means for detecting the temperature within said apparatus;

means for detecting the temperature within said apparatus;

means for switching the heat releasing rate of said heat releasing means between at least two level modes, in accordance with the temperature detected by said temperature detecting means including at times after copying operation is completed; and means for driving said heat releasing means in a mode having a higher cooling efficiency than any other of at least two level modes, to control the temperature within said apparatus when, as a result of successive image formation, the number of times image formation is performed exceeds a predetermined value.

18. An apparatus according to claim 17, wherein said switching means switches said heat releasing means between the two level modes, said modes being a stop mode and a rotation mode, to control a temperature within said apparatus.

19. An apparatus according to claim 17, wherein said switching means switches said heat releasing means between two level modes, said modes being a low-speed and a high-speed rotation mode, to control the temperature within said apparatus.

* * * * *